United States Patent
Jeong et al.

(10) Patent No.: US 10,043,403 B2
(45) Date of Patent: Aug. 7, 2018

(54) AIRCRAFT LANDING APPARATUS USING GNSS AND SBAS SIGNALS, AND CONTROL METHOD THEREOF

(71) Applicant: KOREA AEROSPACE RESEARCH INSTITUTE, Daejeon (KR)

(72) Inventors: Myeong-Sook Jeong, Daejeon (KR); Dae-Keun Jeon, Daejeon (KR); Joongwon Bae, Daejeon (KR); Hyang-sig Jun, Daejeon (KR); Young Jae Lee, Seoul (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 158 days.

(21) Appl. No.: 15/098,378

(22) Filed: Apr. 14, 2016

(65) Prior Publication Data

US 2017/0116866 A1   Apr. 27, 2017

(30) Foreign Application Priority Data

Oct. 26, 2015 (KR) .......................... 10-2015-0149001

(51) Int. Cl.
*G06F 19/00* (2018.01)
*G08G 5/02* (2006.01)
(Continued)

(52) U.S. Cl.
CPC .............. *G08G 5/025* (2013.01); *G01S 19/15* (2013.01); *G05D 1/0676* (2013.01); *G08G 5/0021* (2013.01)

(58) Field of Classification Search
CPC ...... G08G 5/025; G08G 5/0021; G01S 19/15; G05D 1/0676
See application file for complete search history.

(56) References Cited

U.S. PATENT DOCUMENTS

| 2009/0115637 | A1* | 5/2009 | Naimer ................. | G01C 23/00 340/979 |
| 2013/0079958 | A1* | 3/2013 | Neri ........................ | G01S 19/15 701/16 |
| 2016/0284222 | A1* | 9/2016 | Nicholls ................. | G01S 1/045 |

OTHER PUBLICATIONS

Myeong-Sook Jeong et al., "Flight test evaluation of ILS and GBAS performance at Gimpo International Airport", GPS Solutions: The Journal of Global Navigation Satellite Systems, Apr. 25, 2015.

* cited by examiner

*Primary Examiner* — Hussein A El Chanti
(74) *Attorney, Agent, or Firm* — Rabin & Berdo, P.C.

(57) ABSTRACT

A landing receiving apparatus for aircraft landing, and a control method thereof are provided, in which the landing receiving apparatus includes a flight management system (FMS) which is inputted with, by a user, destination airport, destination runway, and a receiver mode, a data storage portion which stores approach path data for landing of the aircraft; a receiver portion which calculates aircraft position information by using Global Navigation Satellite System (GLASS) signals and Satellite-Based Augmentation System (SBAS) signals transmitted from an antenna portion, when a receiver mode inputted by a user is a GNSS/SBAS combination mode, and a landing guidance information generating portion which generates landing guidance information by using approach path data corresponding to a destination airport and a destination runway inputted by the user, and the aircraft position information, and transmits the generated landing guidance information to the FMS.

16 Claims, 5 Drawing Sheets

(51) Int. Cl.
*G05D 1/06* (2006.01)
*G08G 5/00* (2006.01)
*G01S 19/15* (2010.01)

Fig.3

| Data Contents | RWY 32L Data Block | RWY 32R Data Block | RWY 14L Data Block | RWY 14R Data Block |
|---|---|---|---|---|
| Operation Type | 0 | 0 | 0 | 0 |
| SBAS Service Provider | 14 | 14 | 14 | 14 |
| Airport ID | RKSS | RKSS | RKSS | RKSS |
| Runway Number | 32 | 32 | 14 | 14 |
| Runway Letter | 3 | 1 | 3 | 1 |
| Approach Performance Designator | 1 | 1 | 1 | 1 |
| Route Indicator | Z | Z | Z | Z |
| Reference Path Data Selector | 2 | 3 | 0 | 1 |
| Reference Path ID | GKMO | GSKP | GSEL | GOFR |
| LTP/FTP Latitude | 373252.8285N | 373251.8900N | 373414.5515N | 373406.1865N |
| LTP/FTP Longitude | 1264803.7080E | 1264825.5760E | 1264641.8025E | 1264631.5960E |
| LTP/FTP Height(m) | 35.5 | 35.8 | 34.4 | 33.3 |
| Delta FPAP Latitude(second) | 73.3580 | 82.6615 | -82.6615 | -73.3580 |
| Delta FPAP Longitude | -92.1120 | -103.7735 | 103.7735 | 92.1120 |
| Approach TCH(ft) | 54.0 | 54.0 | 52.0 | 52.0 |
| Approach TCH Units Selector | 0 | 0 | 0 | 0 |
| Glide Path Angle | 3.00 | 3.00 | 3.00 | 3.00 |
| Course Width at Threshold(m) | 106.75 | 106.75 | 106.75 | 106.75 |
| Delta Length Offset(m) | 0 | 0 | 0 | 0 |
| Final Approach Segment CRC | 26B2E61C | 45EF9349 | 62DE9EEF | B2A9723A |

AIRCRAFT LANDING APPARATUS USING GNSS AND SBAS SIGNALS, AND CONTROL METHOD THEREOF

CROSS-REFERENCE TO RELATED APPLICATIONS

This application claims priority from Korean Patent Application No. 2015-0149001, filed on Oct. 26, 2015 in the Korean Intellectual Property Office, the disclosure of which is incorporated herein by reference in its entirety.

STATEMENT REGARDING PRIOR DISCLOSURES BY THE INVENTOR OR A JOINT INVENTOR

Applicant hereby states under 37 CFR 1.77(b)(6) that Myeong-Sook Jeong, Joongwon Bae, Hyang-Sig Jun, and Young Jae Lee, Flight test evaluation of ILS and GBAS performance at Gimpo International Airport, GPS Solutions: The Journal of Global Navigation Satellite Systems, published on Apr. 25, 2015, is designated as a grace period inventor disclosure. The disclosure: (1) was made one year or less before the effective filing date of the claimed invention; (2) names the inventor or a joint inventor as an author; and (3) does not name additional persons as authors on a printed publication.

BACKGROUND

1. Field of the Invention

The present disclosure relates to an aircraft landing receiving apparatus and a control method thereof, and more particularly, to an aircraft landing receiving apparatus and a control method thereof capable of generating deviation information for aircraft landing by using Satellite-Based Augmentation System (SBAS) signals and Global Navigation Satellite System (GNSS) signals, and providing landing guidance information by using the same.

2. Description of the Related Art

Existing systems that provide aircrafts with landing guidance information for the safe landing of the aircraft on the runway include the Instrument Landing System (ILS), MLS, VHF Omni directional range (VOR), non-directional beacon (NDB), tactical air navigation (TACAN), GNSS, and so on. Among these, ILS and MLS provide precision approach services (CAT I/II/II), while VOR, NDB, TACAN, GNSS, and so on provide non-precision approach services.

Precision approach service refers to the service that allows an aircraft to approach at a predetermined angle of descent, by providing the aircraft with azimuth, distance and gliding angle information for the runway landing. The non-precision approach service refers to the service that is able to provide only the azimuth and distance information, but not the gliding angle (or altitude) information, thus allowing step-wise descent per flight stages. The precision approach service provides high accuracy azimuth and distance information, and thus can guide the aircraft to a point closer to the runway than the non-precision approach service is able to.

Recently, the Ground-Based Augmentation System (GBAS) and the Satellite-Based Augmentation System (SBAS) have been developed, which are the Global Navigation Satellite System (GNSS)-based systems that can provide the aircraft with landing guidance information.

Like the ILS, the GBAS can provide the precision approach service (it is currently able to provide only CAT-I service yet), while the SBAS can provide non-precision approach service. However, since the azimuth and distance information provided by the SBAS have a far greater accuracy than the existing VOR, NDB, TACAN, GNSS, and so on, it enables greater precision approach than the existing precision approach service.

Further, while the existing non-precision approach service systems are not able to provide the gliding angle information, SBAS can provide high altitude information with a certain level of accuracy (accuracy: 8-20 m), although it cannot provide the altitude information (accuracy: 4 m) comparable to that of the CAT-I precision approach service. Further, unlike the equipment mentioned above (i.e., ILS, MLS, VOR, etc., except for GNSS), SBAS provide advantage that it can receive only the SBAS augmentation information provided from the SBAS satellite and the GNSS signals provided from the GNSS satellite, and provide a certain level (e.g, APV-I, APV-II) of landing guidance services to the aircraft, without requiring separate equipment be installed on the ground.

Further, since SBAS transmits and receives signals through the satellite, unlike the other ground equipment, it can provide wide area service. Since it is possible to receive SBAS signals across the entire country through only one piece of SBAS satellite, it is not necessary to install separate ground equipment in each airport.

Meanwhile, like the existing ILS, MLS and GBAS, the SBAS can provide the azimuth and horizontal guidance information about runway, and in addition, the SBAS can also provide vertical guidance information with a certain level of accuracy. Accordingly, SBAS can generate and provide the lateral deviation and vertical deviation information provided by these systems. The currently available aircraft-mounted apparatus that can generate such deviation information includes an ILS receiver, and a multi-mode receiver (MMR). However, the ILS receiver is able to receive and process only the signals of the ILS ground equipment. The MMR is able to receive respective ILS, MLS, and GBAS signals and provide the deviation information provided by the respective systems, but it cannot generate deviation information that uses SBAS signals. The MMR has a built-in GNSS signal processing apparatus that can receive GNSS signals to generate GBAS deviation information, and the signal processing apparatus can receive the SBAS signals. However, the MMR is not configured to generate the deviation information using the SBAS signals. Further, being a high-price landing receiving apparatus, MMR is not easily used for low-price small aircrafts.

Meanwhile, ILS installed at the airport radiates directional radio waves with an analogue method. Accordingly, influence by the signal interferences due to increasing width of beams and topographic obstacles as a distance from the airport increases. Accordingly, the error in the lateral/vertical deviation information provided by the aircraft-mounted ILS receiver increases as the distance from the airport increases, and the phenomenon becomes severer particularly in the cases of small/low-price aircrafts. In contrast, the SBAS receiving signals from the satellites can provide the deviation information with a certain level of accuracy without being influenced by the distance from the runway. Particularly, at 10 NM away from the runway, in terms of accuracy aspect alone, the SBAS deviation information provides higher accuracy than the ILS deviation information.

Accordingly, increasing demand is anticipated for an aircraft landing receiving apparatus and a control method thereof, which can provide far greater approach service than the existing non-precision approach services, allow service reception at any part of the country without requiring installation of separate ground equipment at each airport, and generate deviation information for the aircraft landing and provide landing guidance information by using SBAS signals that provide accuracy exceeding a certain level.

SUMMARY

An object of the present disclosure is to solve the problems mentioned above, and accordingly, it is an object of the present disclosure to provide an aircraft landing receiving apparatus and a control method thereof, which are capable of generating deviation information for aircraft landing by using SBAS signals and GNSS signals, and providing landing guidance information using the same.

According to an exemplary embodiment of the present disclosure, an aircraft landing receiving apparatus is provided, which may include a data storage portion configured to store approach path data for landing of an aircraft, a receiver portion configured to calculate aircraft position information by using Global Navigation Satellite System (GLASS) signals and Satellite-Based Augmentation System (SBAS) signals transmitted from an antenna portion, when a receiver mode inputted by a user is a GNSS/SBAS combination mode, and a landing guidance information generating portion configured to generate landing guidance information by using approach path data corresponding to a destination airport and a destination runway inputted by the user, and the aircraft position information, and to transmit the generated landing guidance information to a flight management system (FMS).

The aircraft landing receiving apparatus may additionally include a portable terminal configured to receive from the user information about an item corresponding to approach path information for use in aircraft landing to generate approach path data having a predetermined format, and to upload the generated result to the data storage portion.

According to an exemplary embodiment of the present disclosure, a control method of an aircraft landing receiving apparatus is provided, which may include inputting, from a user, a destination airport, a destination runway, and a receiver mode, calculating aircraft position information by using Global Navigation Satellite System (GLASS) signals and Satellite-Based Augmentation System (SBAS) signals transmitted from an antenna portion, when the inputted receiver mode at a receiving portion is a GNSS/SBAS combination mode, and generating, at a landing guidance information generating portion, landing guidance information by using approach path data corresponding to the inputted destination airport and destination runway, and the aircraft position information, and transmitting the same.

The control method of the aircraft landing receiving apparatus may include additionally include inputting, at a portable terminal and by the user, information about an item corresponding to approach path information for use in aircraft landing to generate approach path data having a predetermined format, and uploading the generated result to a data storage portion of the aircraft landing receiving apparatus.

The information inputted to the portable terminal may include an airport chart.

The predetermined format may be a GBAS MT4 message format.

When the inputted receiver mode is a single GNSS mode, the receiver portion may calculate the aircraft position information by using only the GNSS signals, and the landing guidance information generating portion may transmit the aircraft position information calculated by using only the GNSS signals to the FMS.

The portable terminal may be carried around by the user, and connected to the data storage portion and upload the approach path data when update of previously-stored approach path data of the data storage is necessary.

The landing guidance information may include aircraft lateral deviation, aircraft vertical deviation, and distance information between the aircraft and a runway.

According to another exemplary embodiment of the present disclosure, a computer-readable recording medium is provided, which may record programs for implementing any of the methods described above.

According to various exemplary embodiments of the present disclosure, even the aircraft not installed with high-price apparatus such as ILS or MMR can be provided with not only the precision aircraft position information using SBAS, but also the vertical deviation information, the lateral deviation information, and the distance information to runway threshold, and thus is allowed to perform far safer landing on runway than with the existing non-precision approach services. Further, decreased needs for numerous high-price components allows development as an economic type, which can be easily applied to small-size aircraft or unmanned aircraft. Further, according to various exemplary embodiments, when applied to small-size aircraft and unmanned aircraft that is more likely to land on or take off in the area where there is no equipment for the safety of air navigation such as ILS, or in the open space where there is no runway provided, the present disclosure can provide safer and more accurate guidance for landing. Particularly, the aircraft landing receiving apparatus according to various exemplary embodiments provides advantage that it can be used in any region, as it does not require separate ground-based equipment.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 3 is a view illustrating a result of generating data on approach paths of each runway at Gimpo International Airport based on the data format of Table 1;

DETAILED DESCRIPTION OF EXEMPLARY EMBODIMENTS

Figure 1:
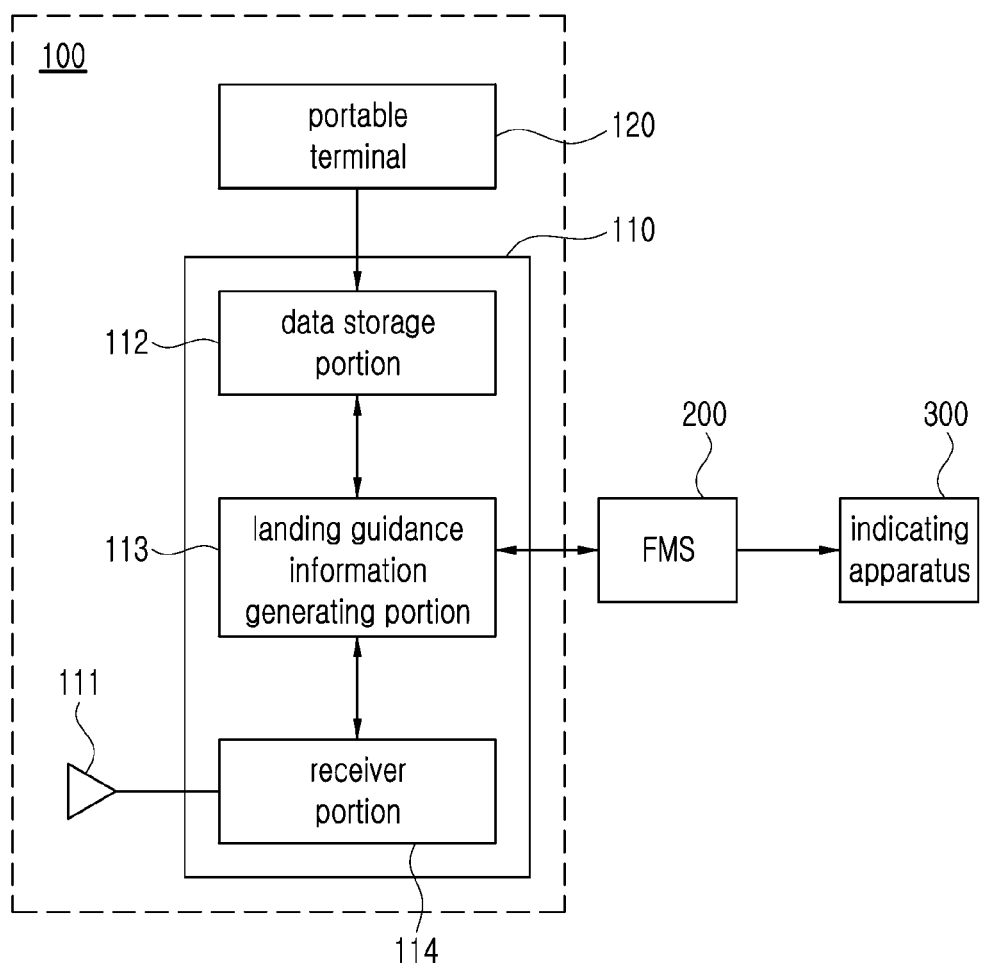
FIG. 1 is a landing receiving apparatus for aircraft landing according to an exemplary embodiment.

Certain exemplary embodiments of the present inventive concept will be described in greater detail with reference to the accompanying drawings to enable those skilled in the art to work the present disclosure. However, it is not intended to limit the technology described herein to any specific embodiments, as it should be construed as encompassing various modifications, equivalents and/or alternatives of the embodiments. In the following description, issues irrelevant with the description are not described as these may obscure the description, and same drawing reference numerals are used for the same elements even in different drawings.

Certain exemplary embodiments of the present inventive concept will now be described in greater detail with reference to the accompanying drawings to enable those skilled in the art to work the present disclosure.

FIG. 1 is a block diagram provided to explain a landing receiving apparatus for aircraft landing according to an exemplary embodiment.

Referring to FIG. 1, the landing receiving apparatus 100 for aircraft landing according to an exemplary embodiment may receive a Satellite-Based Augmentation System (SBAS) signal, and a Global Navigation Satellite System (GLASS) signal to generate aircraft position information and landing guidance information.

The aircraft position information and the landing guidance information generated from the landing receiving apparatus 100 may be provided to a flight management system (FMS) 200, and indicated to a user (e.g., pilot) through an indicating apparatus 300.

The FMS 200 may perform a function of controlling the flight of the aircraft, and may perform a function of providing optimum information necessary for auto-control of the pilot system and engine system based on user inputs and information provided from the landing receiving apparatus 100.

Specifically, the FMS 200 may receive from the user information such as destination airport, destination runway, receiver mode, and so on. The FMS 200 may transmit the information inputted from the user to the landing receiving apparatus 100 and receive the aircraft position information and the landing guidance information. Of course, an unmanned aircraft may be implemented so as to receive information such as destination airport, destination runway, receiver mode, and so on before taking-off, or inputted with the related information by the user located on the ground through a wireless communication.

The indicating apparatus 300 may be implemented as an apparatus such as a primary fight display (PFD) or a course deviation indicator (CDI) that can indicate information related with aircraft operation.

The landing receiving apparatus 100 may include an airborne apparatus portion 110 mounted to the aircraft, and a portable terminal 120 carried around by the user. The airborne apparatus portion 110 may include an antenna portion 111, a data storage portion 112, a landing guidance information generating portion 113, and a receiver portion 114.

The portable terminal 120 is a separate information communication terminal separated from the airborne apparatus portion 110 mounted to the aircraft, which performs, when necessary, a function of generating final approach segment (FAS) data for the runway landing of the aircraft in a certain format (e.g., GBAS MT4 message format, and so on), based on the airport runway approach charts and airport information of the respective airports.

The portable terminal 120 may be connected to the data storage portion 112 of the airborne apparatus portion 110 and upload the data only when it is necessary to update the approach path data stored in the data storage portion 112 of the airborne apparatus portion 110.

The antenna portion 111 may be implemented as an antenna that can simultaneously receive GNSS signals and SBAS signals. The antenna portion 111 transmits the received GNSS signals and SBAS signals to the receiver portion 114.

The receiver portion 114 receives from the antenna portion 111 the GNSS signals and the SBAS signals, and generates the aircraft position information according to the receiver mode information transmitted from the landing guidance information generating portion 113. The receiver portion 114 provides the generated aircraft position information to the landing guidance information generating portion 113.

In an example, the receiver mode information may be classified into a first mode (i.e., single GNSS mode) in which the aircraft position information is calculated by using only the GNSS signals, and a second mode (i.e., SBAS/GNSS combination mode) in which the aircraft position information is calculated by processing both the GNSS signals and SBAS signals. The second mode enables more accurate aircraft position information calculation than the first mode.

The data storage portion 112 may be implemented as an internal memory module, and store the approach path data of the respective runways uploaded from the portable terminal 120 into a predetermined format. The data storage portion 112 transmits the approach path data of a corresponding airport runway to the landing guidance information generating portion 113 every time there is a request for the approach path data from the landing guidance information generating portion 113.

The landing guidance information generating portion 113 receives from the FMS 200 the information such as the destination airport, destination runway, receiver mode, and so on, inputted by the user. The landing guidance information generating portion 113 then transmits the receiver mode information to the receiver portion 114 to be provided with the aircraft position information according to the corresponding mode. Further, the landing guidance information generating portion 113 is provided with the approach path data with respect to the destination airport and runway from the data storage portion 112.

When the receiver mode is the first mode, the landing guidance information generating portion 113 transmits the aircraft position information processed by using only the GNSS signals, to the FMS 200. Meanwhile, when the receiver mode is the second mode, the landing guidance information generating portion 113 generates the aircraft landing guidance information including information of aircraft lateral deviation, aircraft vertical deviation, and distance between aircraft and runway, by using the aircraft position information provided from the receiver portion 114 and the approach path data provided from the data storage portion 112, and transmits the generated information along with the aircraft position information to the FMS 200.

Figure 2:
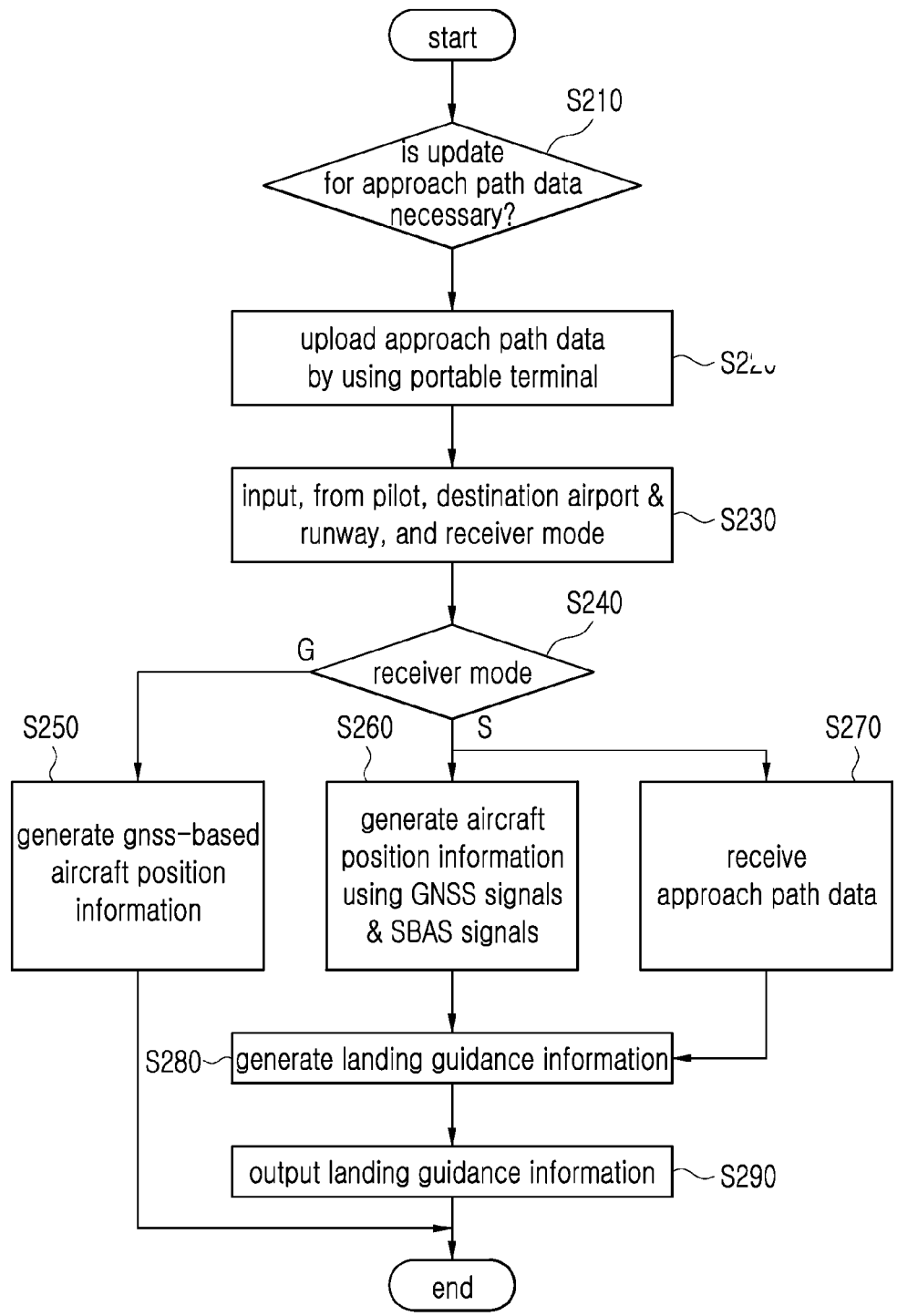
FIG. 2 is a flowchart provided to explain an operation of a landing receiving apparatus for aircraft landing, according to an exemplary embodiment.

Referring now to FIG. 2, the operation of the landing receiving apparatus for aircraft landing according to an exemplary embodiment will be described in detail.

FIG. 2 is a flowchart provided to explain an operation of the aircraft landing receiving apparatus for aircraft landing according to an exemplary embodiment.

First, at S210-Y, when it is necessary to update the approach path data previously-stored at the data storage portion 112 of the airborne apparatus portion 110, at S220, the user may connect the portable terminal 120 to the airborne apparatus portion 110 and upload the approach path data. The operations at S210 and S220 may be omitted, if the data storage portion 112 installed in the corresponding aircraft already stores the approach path data with respect to the destination airport and runway.

TABLE 1

| Data Contents | Bits Used | Range of Values | Resolution |
|---|---|---|---|
| Operation Type | 4 | 0 | 1 |
| SBAS Service Provider | 4 | 1-15 | 1 |
| Airport ID | 32 | — | — |
| Runway Number | 6 | 0-36 | 1 |
| Runway Letter | 2 | — | — |
| Approach Performance Designator (APD) | 3 | 0-7 | 1 |
| Route Indicator | 5 | — | — |
| Reference Path Data Selector (RPDS) | 8 | 0-48 | 1 |
| Reference Path ID (RPID) | 32 | — | — |
| LTP/FTP Latitude | 32 | ±90.0° | 0.0005 arcsec |
| LTP/FTP Longitude | 32 | ±180.0° | 0.0005 arcsec |
| LTP/FTP Height | 16 | −512-6041.5 m | 0.1 m |
| ΔFPAP Latitude | 24 | ±1.0° | 0.0005 arcsec |
| ΔFPAP Longitude | 24 | ±1.0° | 0.0005 arcsec |
| Approach Threshold Crossing Height (TCH) | 15 | 0-1638.35 m or 0-3276.7 ft | 0.05 m or 0.1 ft |
| Approach TCH Units Selector | 1 | — | — |
| Glide Path Angle (GPA) | 16 | 0-90.0° | 0.01° |
| Course Width (CW) at Threshold | 8 | 80.0 to 143.75 m | 0.25 m |
| ΔLength Offset | 8 | 0 to 2032 m | 8 m |
| Final Approach Segment CRC | 32 | — | — |

The approach path information for use in aircraft landing is defined by the international standard, and GBAS and SBAS use the same format as shown in Table 1. Table 1 lists the MT4 final approach segment (FAS) data block.

At S220, when the user inputs the information on each of the items on Table 1 (e.g., operation type, SBAS service provider, airport ID, and so on), the portable terminal 120 may generate the data block such as 'RWY 32L' of FIG. 3 and uploads the same to the airborne apparatus portion 110.

FIG. 3 illustrates a result of generating approach path data for each runway of the Gimpo International Airport in conformity with the data format of Table 1.

The 'Operation Type' of Table 1 classifies the FAS data block, the TAP data block, or the MA data block. The 'SBAS Service Provider' is to identify the service provider that provides the SBAS service. The information such as 'Airport ID', 'Runway Number', 'Runway Letter', 'APD', 'Route Indicator', 'RPDS', 'RPID' are the information to identify certain approach paths to a certain runway of the destination airport. The FAS data information such as 'LTP/FTP Latitude', 'LTP/FTP Longitude', 'LTP/FTP Height', 'ΔFPAP Latitude', 'ΔFPAP Longitude', 'TCH', 'GPA', 'CW', 'ΔLength Offset', and so on, are the information substantially necessary for the calculation of the approach deviation, and may be defined as shown in FIGS. 4 and 5.

Figure 4:
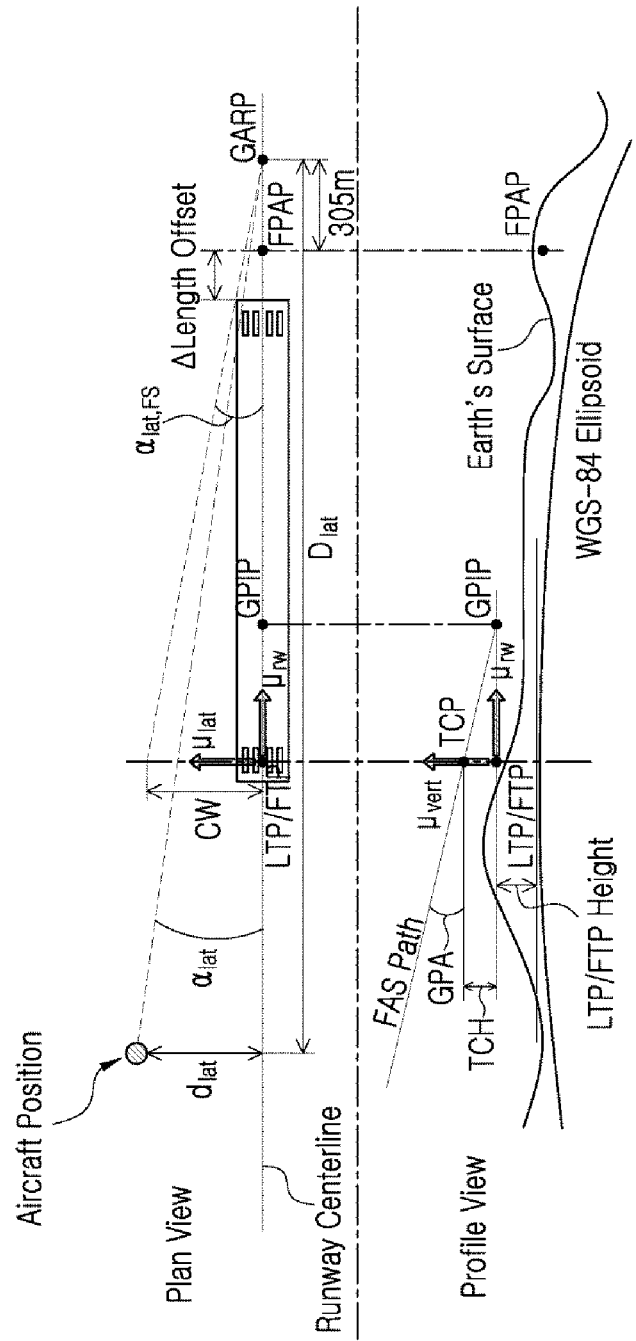
FIG. 4 is a view provided to explain data associated with the lateral deviation in the final approach segment of aircraft landing.
Figure 5:
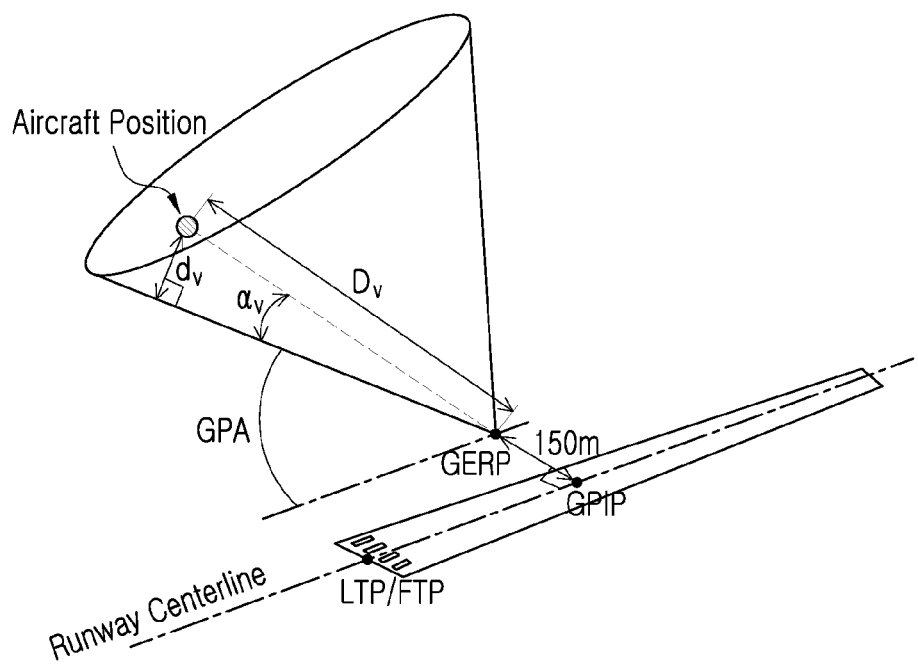
FIG. 5 is a view provided to explain data associated with vertical deviation in the final approach segment of aircraft landing.

FIG. 4 is a view provided to explain data associated with the lateral deviation in the final approach segment of the aircraft landing, and FIG. 5 is a view provided to explain data associated with the vertical deviation in the final approach segment of the aircraft landing.

The meaning of the respective items of the data in Table 1 will be described in more detail below.

1) Operation Type: Type of runway approach method of the aircraft. Categorized by the following numbers:
   0: Straight-in approach path
   1: Terminal airspace path
   2: Missed approach
   3-15: Spare 2) SBAS Service Provider: Identification of a system that provides SBAS service, such as USA's Wide Area Augmentation System (WAAS), Europe's European Geostationary Navigation Overlay Service (EGNOS), Japan's Multi-functional Satellite Augmentation System (MSAS), and so on.

3) Airport ID: Airport Identification Text

4) Runway Number: Number of destination runway

5) Runway Letter: Used for a parallel runway. Identified by the following numbers:
   0: No letter, 1=R (Right), 2=C (Center), 3=L (Left).

6) Approach Performance Designator: Represents performance grade of approach information. Categorized as follows:
   0=GSL A or GSL B, 1=GSL C, 2=GSL D, 3=GSL E, 4=GSL F, 5-7=spare 7) Route Indicator: Used for the purpose of identifying several aircraft approach paths approaching the same runway threshold. Marked by one capital alphabet letter among A to Z. Note, I and O cannot be used and may be marked as 'Spare'.

8) Reference Path Data Selector: Used for the purpose of identifying runway threshold where aircraft landing is possible. 0 to 48 can be allotted (when there are two runways and aircraft can land on both ends of each of the runway, total 4 RPDS may be generated).

9) Reference Path ID: Composed of 3 to 4 alphabet letters to identify the station of the air navigation safety equipment.

10) Landing threshold point/frictitious threshold point (LTP/FTP) Latitude: Latitude value of approached runway threshold coordinates. Expressed in degrees, minutes, and seconds.

11) LTP/FTP Longitude: Longitude value of approached runway threshold coordinates. Expressed in degrees, minutes, and seconds.

12) LTP/FTP Height: Height value of approached runway threshold coordinates. Expressed in meters.

13) Δ FPAP Latitude: Difference in latitudes between LTP/FTP and FPAP. Expressed in seconds.

14) Δ FPAP Longitude: Difference in longitudes between LTP/FTP and FPAP. Expressed in seconds.

15) Approach threshold crossing point (TCH): Height value when the aircraft in descending operation onto runway crosses the runway threshold.

16) Approach TCH Units Selector: Information representing unit of Approach TCH (0=feet, 1=meter).

17) Glide Path Angle: Glide angle when the aircraft lands on runway.

18) Course Width at Threshold: Lateral distance at LTP/FTP resulting in full-scale deflection by the course deviation indicator (CDI). The 'distance' as used herein refers to lateral distance from the runway center.

19) Delta Length Offset: Distance between end of runway and FPAP.

20) Final Approach Segment CRC: CRC values of final approach segment data defined by 1) to 19) above.

Accordingly, when the user inputs into the portable terminal 200 the information corresponding to the data items described above with respect to the destination airport or runway intended for landing, and open area available for landing, to the approach path data generating apparatus, the information such as data block of 'RWY 32L' exemplified in FIG. 3 is generated by the portable terminal 200. The portable terminal 200 may transmit the generated approach path data to the airborne apparatus portion 110 installed on the aircraft by a predetermined communication method (e.g., RS232, ARINC 429, 1553B, and so on).

Referring back to FIG. 2, at S230, the FMS 200 may be inputted with the destination airport, destination runway, and the receiver mode, by the user.

Next, at S240-G, when the receiver mode is the first mode (single GNSS mode) in which the aircraft position information is calculated using only the GNSS signals, at S250, the receiver portion 114 generates the aircraft position information by using only the GNSS signals. The GNSS signal-based aircraft position information generated at S250 may be transmitted to the FMS 200 via the landing guidance information generating portion 113, and indicated to the user by the indicating apparatus 300.

Meanwhile, at S240-S, when the receiver mode is the second mode (SBAS/GNSS combination mode) in which the aircraft position information is calculated by processing both the GNSS signals and the SBAS signals, at S260, the receiver portion 114 may generate more accurate aircraft position information by processing both the GNSS signals and the SBAS signals together. The aircraft position information generated at S260 provides excellent precision than the aircraft position information generated at S250. Further, at S270, the landing guidance information generating portion 113 receives from the data storage portion 112, the approach path data corresponding to the destination airport and runway inputted by the user.

Next, at S280, the landing guidance information generating portion 113 generates landing guidance information by using the aircraft position information generated at S260, and the approach path data received at S270.

The landing guidance information generated at S280 may include the information such as aircraft lateral deviation, aircraft vertical deviation, and distance between aircraft and runway.

Next, at S290, the landing guidance information generating portion 113 may output the landing guidance information generated at S280, and the aircraft position information generated at S260. At S290, the landing guidance information may be provided to the flight management system (FMS) 200, and indicated to the user through the indicating apparatus 300.

Meanwhile, when the receiver mode is the first mode, the aircraft position information processed by using GNSS signals only at S250 may be provided to the FMS 200 and indicated to the user through the indicating apparatus 300.

Then among the landing guidance information generated at S280, the aircraft lateral deviation and the aircraft vertical deviation may be calculated at the landing guidance information generating portion 113 by the equation described below.

Basically, the GNSS system uses the WGS84 Earth Centered Earth Fixed (ECEF) Cartesian Coordinate and therefore, the differentially-corrected aircraft position information obtained through the GBAS or SBAS system is expressed in ECEF coordinate system having a center of the earth as the origin. However, it is necessary that the aircraft coordinate is expressible with reference to the runway in order to calculate the lateral and vertical deviation of the aircraft. Accordingly, as illustrated in FIG. 3, an arbitrary coordinate system, having LTP/FTP as an origin and unit vectors $\vec{\mu}_{vert}$, $\vec{\mu}_{lat}$, $\vec{\mu}_{rw}$ as three axes, may be made, and the deviation may be calculated by expressing the aircraft position based on such coordinate system.

First, with reference to LTP/FTP, the vertical unit vector $\vec{\mu}_{vert}$ in the vertical direction of the runway may be expressed as the equation 1 below.

$$\vec{\mu}_{vert} = \frac{(\vec{r}_{TCP}^{ECEF} - \vec{r}_{LTP/FTP}^{ECEF})}{TCH} \quad \text{[Equation 1]}$$

where, $\vec{r}_{TCP}^{ECEF}$ and $\vec{r}_{LTP/FTP}^{ECEF}$ denote vectors from the center of the Earth to TCP and LTP/FTP, respectively, on the WGS84 ECEF Cartesian coordinate system. The TCP coordinate value may be obtained by using the LTP/FTP coordinate and the TCH information included in the FAS data.

Meanwhile, the unit vector $\vec{\mu}_{lat}$ in the lateral direction of the runway with reference to LTP/FTP is calculated by Equations 2 and 3 below.

$$\vec{\mu}_{FPAP}^{LTP/FTP} = \frac{(\vec{r}_{FPAP}^{ECEF} - \vec{r}_{LTP/FTP}^{ECEF})}{\|\vec{r}_{FPAP}^{ECEF} - \vec{r}_{LTP/FTP}^{ECEF}\|} \quad \text{[Equation 2]}$$

$$\vec{\mu}_{lat} = \frac{\vec{\mu}_{vert} \times \vec{\mu}_{FPAP}^{LTP/FTP}}{\|\vec{\mu}_{vert} \times \vec{\mu}_{FPAP}^{LTP/FTP}\|} \quad \text{[Equation 3]}$$

where, $\vec{r}_{FPAP}^{ECEF}$ denotes the vector from the center of the Earth to the FPAP, on the WGS84 ECEF Cartesian coordinate system, in which the FPAP coordinate may be obtained by using the LTP/FTP coordinate, ΔFPAP Latitude, ΔFPAP Longitude included in the FAS data.

Next, with reference to LTP/FTP, the unit vector $\vec{\mu}_{rw}$ in the longitudinal direction of the runway is calculated by Equation 4 below.

$$\vec{\mu}_{rw} = \vec{\mu}_{lat} \times \vec{\mu}_{vert} \quad \text{[Equation 4]}$$

The lateral deviation may be calculated by using the unit vectors $\vec{\mu}_{vert}$, $\vec{\mu}_{lat}$, $\vec{\mu}_{rw}$ as defined by Equations 1 to 4 described above. To this purpose, first, it is necessary to obtain the coordinate of a point called the GLS Azimuth Reference Point (GARP) that is defined by SBAS. The GARP is a virtual point located on the same line as LTP/FTP and FPAP, as illustrated in FIG. 4, and it is located 305 m away from the FPAT in the aircraft approaching direction. Compared to ILS, the GARP is the point similar to the localizer coordinate point, and serves as a vertex when the lateral deviation of the aircraft is expressed as an angle with reference to the runway centerline.

On the WGS84 ECEF Cartesian coordinate system, the GARP coordinate point may be expressed by Equation 5 below.

$$\vec{r}_{GARP}^{ECEF} = \vec{r}_{FPAP}^{ECEF} + \Delta_{GARP}\vec{\mu}_{rw} \quad \text{[Equation 3]}$$

where, ΔGARP is 305 m.

The aircraft lateral deviation may be obtained by using $\vec{r}_{GARP}^{ECEF}$ obtained with Equation 5, in three different units. First, the rectilinear lateral deviation expressed in length unit is calculated with Equation 6 below.

$$d_{lat} = \vec{\mu}_{lat} \cdot \left( \vec{r}_{air}^{ECEF} - \vec{r}_{GARP}^{ECEF} \right) \quad \text{[Equation 6]}$$

where, $$\vec{r}_{air}^{ECEF}$$

denotes aircraft position coordinate on the WGS84 ECEF Cartesian coordinate system.

The angular lateral deviation of the aircraft with reference to the GARP may be calculated by using $d_{lat}$ obtained above with Equation 7 below.

$$\alpha_{lat} = \tan^{-1}\left( \frac{d_{lat}}{\left| \vec{\mu}_{rw} \cdot \left( \vec{r}_{air}^{ECEF} - \vec{r}_{GARP}^{ECEF} \right) \right|} \right) \quad \text{[Equation 7]}$$

Further, the lateral deviation of the aircraft may be converted into DDM unit as the ILS, with Equation 8 below.

$$Lat_{DDM} = 0.155 \frac{\alpha_{lat}}{\alpha_{lat,FS}} \quad \text{[Equation 8]}$$

where, $\alpha^{lat,FS}$ denotes an angle value for the full-scale deflection, and is calculated with Equation 9.

$$\alpha_{lat,FS} = \tan^{-1}\left( \frac{CW}{D_G} \right) \quad \text{[Equation 9]}$$

In Equation 9, the course width (CW) value is included in the MT4 FAS data, and $D_G$ represents a distance between LTP/FTP and GARP.

Like the lateral deviation, in order to calculate the vertical deviation in SBAS, it is necessary that the coordinate of the virtual point, i.e., the GLS Elevation Reference Point (GERP), is obtainable as shown in FIG. 5. When seen from the landing approach direction of the aircraft, the GERP is located 150 m away from the GPIP in the left lateral direction, which is similar to the position of the ILS glide slope. The GERP coordinate is calculated with Equation 10 below.

$$\vec{r}_{GERP}^{ECEF} = \vec{r}_{LTP/FTP}^{ECEF} + \frac{TCH}{\tan(GPA)} \vec{\mu}_{rw} + D_{GERP} \cdot \vec{\mu}_{lat} \quad \text{[Equation 10]}$$

where, $D_{GERP}$ denotes 150 m, which is the offset value from the GPIP.

Using the $$\vec{r}_{GERP}^{ECEF}$$

obtained with Equation 10, the angular vertical deviation and rectilinear vertical deviation is calculated with Equations 11 and 12, respectively.

$$\alpha_v = \tan^{-1}\left( \frac{\vec{\mu}_{vert} \cdot \left( \vec{r}_{air}^{ECEF} - \vec{r}_{GERP}^{ECEF} \right)}{\sqrt{\left[ \vec{\mu}_{lat} \cdot \left( \vec{r}_{air}^{ECEF} - \vec{r}_{GERP}^{ECEF} \right) \right]^2 + \left[ \vec{\mu}_{rw} \cdot \left( \vec{r}_{air}^{ECEF} - \vec{r}_{GERP}^{ECEF} \right) \right]^2}} \right) - GPA \quad \text{[Equation 11]}$$

$$d_v = \left\| \vec{r}_{air}^{ECEF} - \vec{r}_{GERP}^{ECEF} \right\| \sin\alpha_v \quad \text{[Equation 12]}$$

where, $\alpha_V$ may then be converted into DDM value as in ILS, with Equation 13 below.

$$Vert_{DDM} = \frac{0.175 \cdot \alpha_v}{0.25 \cdot GPA} \quad \text{[Equation 13]}$$

An exemplary embodiment includes a computer-readable medium including therein program instructions for performing operations implemented on a variety of computers. The medium records programs for implementing a control method of an aircraft landing receiving apparatus for aircraft landing described above. The medium may include program instructions, data files, data architectures, and so on, either alone or in combination. An example of the medium includes a magnetic medium such as hard disk, floppy disk, and magnetic tape, an optical recording medium such as CD and DVD, a magneto-optical medium such as floptical disk, or a hardware device configured to store program instructions and implementing the same, such as ROM, RAN, flash memory, and so on. Alternatively, the medium may be a transmission medium such as light including carrier wave, or metal line, or waveguide, and so on, which transmits signals designating program instructions, data architectures, and so on. An example of the program instructions include not only the machine codes as those that are made by a compiler, but also high-level language codes that are implementable on a computer using an interpreter, and so on.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:
1. An aircraft landing receiving apparatus, comprising:
an airborne apparatus, which includes
a processor, and
a non-transitory storage medium having program instructions stored thereon, execution of which by the processor causes the airborne apparatus to provide functions of:
a data storage portion configured to store approach path data for landing of an aircraft;
a receiver portion configured to calculate aircraft position information by using Global Navigation Satellite System (GNSS) signals and Satellite-Based Augmentation System (SBAS) signals transmitted from an antenna portion, when a receiver mode inputted by a user is a GNSS/SBAS combination mode; and a landing guidance information generating portion configured to generate landing guidance information by using first pieces of the approach path data corresponding to a destination airport and a destination runway inputted by the user, and the aircraft position information, and to transmit the generated landing guidance information to a flight management system (FMS) to control flight of the aircraft; and a portable terminal configured to receive, from the user, information about an item corresponding to approach path information for use in aircraft landing to generate second pieces of the approach path data having a predetermined format, and to upload the generated result to the data storage portion of the airborne apparatus.

2. The aircraft landing receiving apparatus of claim 1, wherein the information inputted to the portable terminal comprises an airport chart.

3. The aircraft landing receiving apparatus of claim 1, wherein the predetermined format comprises a GBAS MT4 message format.

4. The aircraft landing receiving apparatus of claim 1, wherein, when the inputted receiver mode is a single GNSS mode, the receiver portion calculates the aircraft position information by using only the GNSS signals, and the landing guidance information generating portion transmits the aircraft position information calculated by using only the GNSS signals to the FMS.

5. The aircraft landing receiving apparatus of claim 1, wherein the portable terminal is carried around by the user, and connected to the data storage portion and uploads the approach path data when update of previously-stored approach path data of the data storage is necessary.

6. The aircraft landing receiving apparatus of claim 1, wherein the landing guidance information comprises an aircraft lateral deviation, an aircraft vertical deviation, and distance information between the aircraft and a runway.

7. The aircraft landing receiving apparatus of claim 1, wherein the portable terminal is configured to upload the generated second pieces of the approach path data to the data storage portion of the airborne apparatus only when the approach path data stored in the data storage portion do not include the first pieces of the approach path data corresponding to the destination airport and the destination runway.

8. A control method of an aircraft landing receiving apparatus including an airborne apparatus and a portable terminal, comprising:

inputting, from a user, a destination airport, a destination runway, and a receiver mode for an aircraft;

calculating aircraft position information by using Global Navigation Satellite System (GNSS) signals and Satellite-Based Augmentation System (SBAS) signals transmitted from an antenna portion, when the inputted receiver mode at a receiving portion is a GNSS/SBAS combination mode;

generating, at a landing guidance information generating portion, landing guidance information by using first pieces of the approach path data corresponding to the inputted destination airport and destination runway stored in a data storage portion of the airborne apparatus, and the aircraft position information, and transmitting the same to a flight management system (FMS) to control flight of the aircraft; and inputting, at the portable terminal by the user, information about an item corresponding to approach path information for use in aircraft landing to generate second pieces of the approach path data having a predetermined format, and uploading the generated result to the data storage portion of the airborne apparatus.

9. The control method of claim 8, wherein the information inputted to the portable terminal comprises an airport chart.

10. The control method of claim 8, wherein the predetermined format comprises a GBAS MT4 message format.

11. The control method of claim 8, wherein, when the inputted receiver mode is a single GNSS mode, the receiver portion calculates the aircraft position information by using only the GNSS signals, and the landing guidance information generating portion transmits the aircraft position information calculated by using only the GNSS signals to the FMS.

12. The control method of claim 8, wherein the portable terminal is carried around by the user, and connected to the data storage portion and uploads the approach path data when update of previously-stored approach path data of the data storage is necessary.

13. The control method of claim 8, wherein the landing guidance information comprises an aircraft lateral deviation, an aircraft vertical deviation, and distance information between the aircraft and a runway.

14. The control method of claim 8, wherein the uploading the generated result includes uploading the generated second pieces of the approach path data to the data storage portion of the airborne apparatus only when the approach path data stored in the data storage portion do not include the first pieces of the approach path data corresponding to the destination airport and the destination runway.

15. A non-transitory computer-readable recording medium recording programs that are executable by a computer the programs including instructions to input, from a user, a destination airport, a destination runway, and a receiver mode for an aircraft;

calculate aircraft position information by using Global Navigation Satellite System (GNSS) signals and Satellite-Based Augmentation System (SBAS) signals transmitted from an antenna portion, when the inputted receiver mode at a receiving portion is a GNSS/SBAS combination mode;

generate, at a landing guidance information generating portion, landing guidance information by using first pieces of the approach path data corresponding to the inputted destination airport and destination runway stored in a data storage portion of an airborne apparatus, and the aircraft position information, and transmit the same to a flight management system to control flight of the aircraft; and input, at a portable terminal and by the user, information about an item corresponding to approach path information for use in aircraft landing to generate second pieces of the approach path data having a predetermined format, and upload the generated result to the data storage portion of the airborne apparatus.

16. The non-transitory computer-readable recording medium of claim 15, wherein the instructions to upload include instructions to upload the generated second pieces of the approach path data to the data storage portion of the airborne apparatus when the first pieces of the approach path data corresponding to the destination airport and the destination runway have not been stored in the data storage portion.

* * * * *